Feb. 27, 1951  H. C. LEAVITT  2,543,113
FILM PROJECTOR AND VIEWER
Filed Nov. 7, 1946
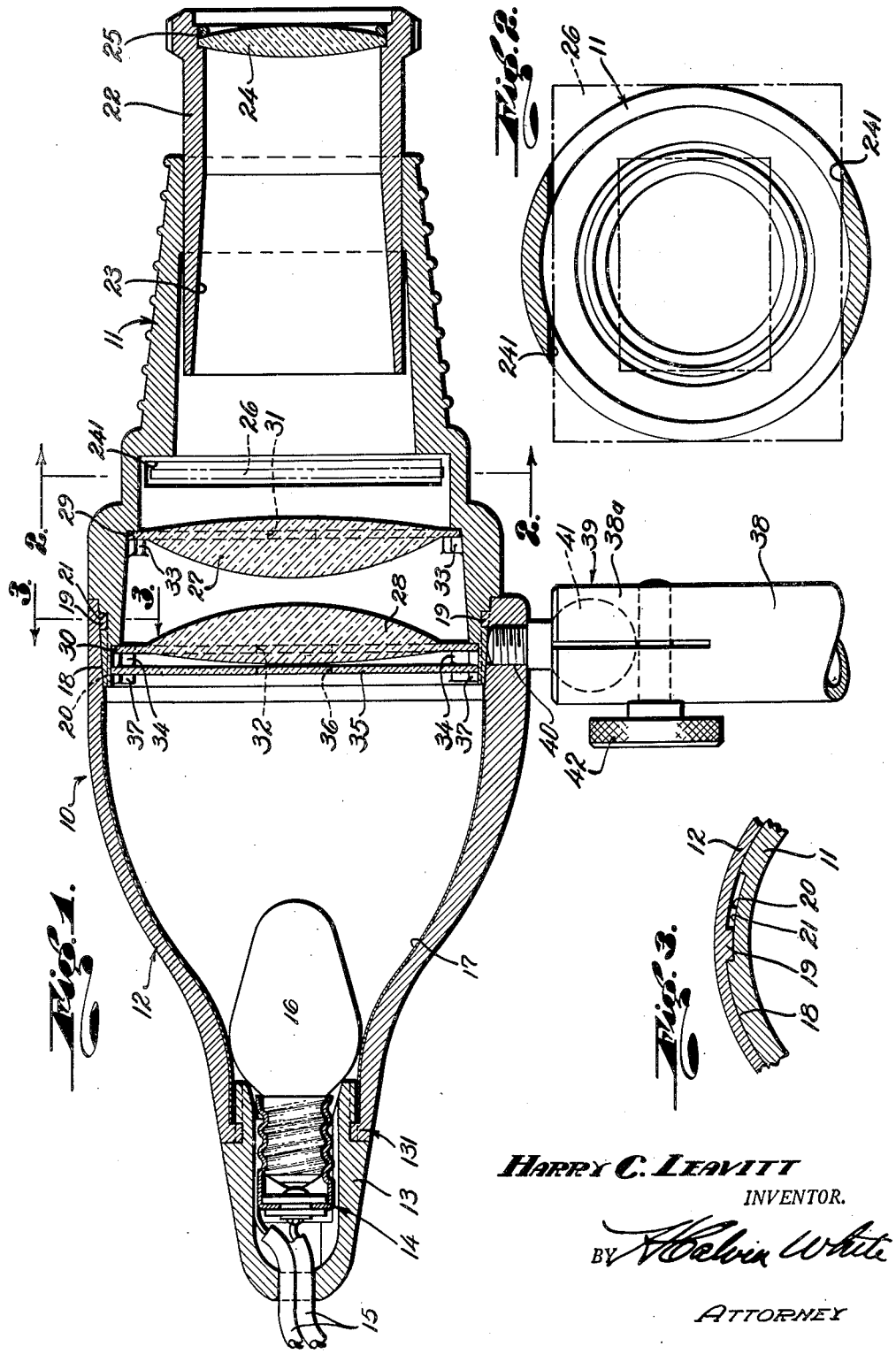
HARRY C. LEAVITT
INVENTOR.
BY *Melvin White*
ATTORNEY Patented Feb. 27, 1951

2,543,113

UNITED STATES PATENT OFFICE 2,543,113

FILM PROJECTOR AND VIEWER

Harry C. Leavitt, Venice, Calif.

Application November 7, 1946, Serial No. 708,312

7 Claims. (Cl. 88—24)

This invention relates to improvements in film projecting and viewing equipment, and has for its general purpose to incorporate in a single device various innovations rendering it useable not only as a projector having less than the illumination heretofore required for satisfactory film projection, but also as a film viewer using either artificial or daylight illumination.

Concerning first the invention as a projector, it has been generally assumed that satisfactory projection of the film image requires an illuminating source of high light intensity, and consequent use of relatively high wattage or candle power lamps.

One of my objects is to depart from such conventional practices by providing a projector capable of projecting the film image with quite satisfactory intensity, depth and clarity of detail, using a single low wattage lamp of the low cost and generally available kind. For my purposes, and in a projector as hereinafter described, I am able to use the ordinary low watt electric lamp to be had in the market at little cost. Both six and ten watt lamps have been used successfully. As will appear, use of such low candle power lamps is made possible by the special light reflective and diffusive characteristics of the surface from which the light is transmitted to the film, and the associated lens arrangements.

Another major object is to provide a single sectional device capable of use in an assembled condition as a projector having the stated characteristics, and useable also as a viewer given artificial illumination in an assembled condition of the device, or as a daylight illuminated viewer embodied in a sectional and independently useable part of the device.

The invention further contemplates a novel sectional construction of the projector-viewer, and its mounting upon a base in a manner permitting universal movement or adjustment of the device when used as a projector or electrically illuminated viewer, and corresponding support and adjustability of the lamp section remaining after removal of the viewer section.

Numerous additional features and objects are contemplated, but all these, as well as the details of an illustrative embodiment of the invention will be better understood from the following description of the accompanying drawing, in which:

Fig. 1 is a view showing the combination projector and viewer in longitudinal cross-section;

Fig. 2 is a section on line 2—2 of Fig. 1; and

Fig. 3 is a fragmentary section on line 3—3 of Fig. 1.

As illustrated, the device comprises a tubular body structure 10 including a forward viewer or projector section 11 and a rear lamp section 12, the latter having substantially parabolic convergence toward its rear end which is closed by plug 13 having a bayonet or overlapping lug-type connection at 131 with section 12 to permit removal of the plug. The latter contains a suitable metallic lamp socket assembly 14 connected with the conductors 15. The low wattage lamp 16, e. g., small ordinary and inexpensive 10 watt white bulb lamp, projects forwardly from the plug within the convergent portion of body section 12, so that the lamp is surrounded by and radiates light against the body reflector surface or coating 17.

As previously indicated, because of the low wattage or candle power of the lamp, it is essential that the body reflector surface be efficient to the extent of transmitting to the condensing lens a high percentage of the lamp emission. On the other hand, because of the necessity for avoiding undue visual indication of the lamp filament in the projected light, it is essential that in being reflected from surface 17, the light become dispersed to a degree at least largely obliterating the usual filament effect. After considerable investigation it has been determined that a coating of substantially white enamel applied to the surface 17, and extending throughout its axially curved extent, has sufficient reflectivity to obtain the required light intensity, and at the same time will so disperse the reflected light as to obviate any undesirable filament effect.

The body sections 11 and 12 are interconnected at the joint 18 in a manner permitting quick and easy detachment of the forward section, as and for the purposes later explained. The joint 18 is shown to be of a bayonet and slot type, comprising one or more circularly spaced lugs 19 insertible through longitudinal ways 20 for reception within circular groove 21 in section 11, so that the lugs may be rotated therein to interlock the sections.

The forward convergent end of section 11 contains the axially adjustable tube 22 having its bore flared at 23 and containing the projection lens 24 held in place by the lock ring 25. Rearwardly of the tube 22, opposite sides of the body are slotted at 241 for reception of the film, typically a film slide as indicated by the dot-dash lines 26. Rearwardly of the film position section 11 contains a pair of condensing lenses 27 and 28, respectively of greater and lesser overall diameters and engaged against the shoulders 29 and 30. These lenses may conveniently be held in place by forming them with diametrically spaced slots 31 and 32 which pass the body lugs 33 and 34 to permit rotation of the lens peripheries into confinement between shoulders 29 and 30 and the lugs.

Normally, i. e. when used as a projector, the device is assembled without insertion of the latter described diffusion screen, so that light transmitted from the lamp and reflected from the enamel surface 17 reaches the film through the condensing lenses 27 and 28. The film image is projected through lens 24, and as viewed upon a screen, is found to have exceptional intensity, detail and other desirable qualities, considering the low candle power of the lamp. For adaptation of the device for viewing film with the illumination derived from the lamp 16, a diffusion screen 35 consisting for example of a plastic disc having a sandblasted surface, is inserted within the inner end of body section 11. The screen disc has diametrically opposed notches or recesses indicated by the dotted line 36, adapted to pass the body lugs 37, and permit rotation of the screen into confined condition between these lugs and the lens retaining lugs 34. As viewed through the projection lens tube 22, against the condensing lens and illuminated screen background, the film is given magnification and sufficient intensity and uniformity of illumination as to appear brightly and in full detail.

With the diffusion screen 35 in place as illustrated, the forward body section assembly may be used as a film viewer independently of the body section 12. When detached therefrom, the front section viewer may be used with daylight or artificial light from any source for illumination of the film through the diffusion screen.

A feature of particular advantage is the mounting of the body assembly so that while used as a projector, or as a viewer with illumination from the lamp 16, the device may have universal adjustment or movement. The body is shown to be carried on the standard 38 of a base (not shown) suitable for placement on a table, and to have at 39 a tripod type of universal joint connection with the body 16. Specifically, body section 12 is shown to carry at 40 a ball component 41 of the joint, which is received within the top split portion 38a of the standard carrying a clamp screw 42 which may be tightened to hold the projector body horizontally or in any position of inclination. With section 11 removed, section 12 may serve as a lamp or light source, conveniently useable for any of various purposes by reason of its swivel adjustability on the standard 38, or its detachability therefrom, as the purpose may require.

I claim:

1. A film projector comprising a tubular body having separable forward and rear sections, said rear section converging rearwardly to a closed end, an electric lamp in said closed end, a base, means including a universal joint for detachably securing the forward portion of said rear section to the base, spaced condensing and projection lenses contained in said forward section, means for reception of a film between said lenses, and means for receiving a light diffusing screen within the rear end portion of said forward section when detached from the base to permit use of said forward section as a daylight film viewer.

2. A film projector and viewer comprising a tubular body having separable forward and rear sections, said rear section converging toward a closed end, an electric lamp within said end and extending forwardly to be directly surrounded by the convergent body wall, a light diffusing screen within and removable from said forward section, spaced condensing and projection lenses ahead of said screen, and means between said lenses for reception of a film, the film image being projectible through the projection lens by light from said lamp when said screen is removed, and the film image being viewable through the projection lens by virtue of the screen when the screen is positioned in said forward section.

3. A film projector and viewer comprising a tubular body having separable forward and rear sections, said rear section converging toward a closed end, an electric lamp within said end and extending forwardly to be directly surrounded by the convergent body wall, a light diffusing screen within and removable from said forward section, an axially adjustable projection lens tube in the front of said forward section, a condensing lens between said screen and tube, and means for reception of a film between said condensing lens and tube, the film image being projectible through the projection lens by light from said lamp when said screen is removed, and the film image being viewable through the projection lens by virtue of the screen when the screen is positioned in said forward section.

4. A film projector and viewer comprising a tubular body having separable forward and rear sections, said rear section converging toward a closed end, an electric lamp within said end and extending forwardly to be directly surrounded by the convergent body wall, the power of said lamp not exceeding about ten watts, a substantially white enamel light reflective and diffusing coating on the inner surface of said convergent body wall, a light diffusing screen within and removable from said forward section, an axially adjustable projection lens tube in the front of said forward section, a condensing lens between said screen and tube, and means for reception of a film between said condensing lens and tube, the film image being projectible through the projection lens by light from said lamp when said screen is removed, and the film image being viewable through the projection lens by virtue of the screen when the screen is positioned in said forward section.

5. A film projector and viewer comprising a hollow body having a rear section and a light passing forward section detachably secured together, an electric lamp contained in the rear portion of the body, said rear and forward portions being in operative light passing alignment with respect to each other and said lamp, a projection lens carried by said forward section, slot means in the forward section for receiving between said lamp and said projection lens a film for projection of its image by light passing from said lamp through the operatively aligned sections and through the film and lens, a light diffusing screen, and means for removably mounting said screen in the forward section rearward of said slot means, and between the film and lamp, whereby removal of the forward section will permit viewing of the film independent of said lamp through said lens.

6. A film projector and viewer comprising a tubular body having separable forward and rear sections, an electric lamp contained in said rear section, a projection lens carried by said forward section, the latter containing intermediate its ends a film reveiving opening, a condensing lens contained in said forward section rearwardly of said opening, and a light diffusing screen removably positioned between said condensing lens and the rear end of said forward section to permit viewing of the film through said forward section with the latter connected to or disconnected from said rear section, the film image being projectible by light from said lamp through said projection lens when said screen is removed.

7. A film projector comprising a tubular body having separable forward and rear sections, said rear section converging rearwardly to a closed end, an electric lamp in said closed end, a base, means for securing said rear section to the base, spaced condensing and projection lenses contained in said forward section, means for reception of a film between said lenses, a light diffusing screen, and means for removably retaining said screen within the rear end portion of said forward section when detached from the base to permit use of said forward section as a daylight film viewer.

HARRY C. LEAVITT.

REFERENCES CITED

The following references are of record in the file of this patent:

UNITED STATES PATENTS

| Number | Name | Date |
| --- | --- | --- |
| 1,136,697 | Minor | Apr. 20, 1915 |
| 1,504,989 | Spitzer | Aug. 12, 1924 |
| 1,664,038 | McEwing | Mar. 27, 1928 |
| 1,665,426 | Verdich | Apr. 10, 1928 |
| 1,808,176 | Pieper et al. | June 2, 1931 |
| 2,357,542 | Pfeil | Sept. 5, 1944 |
| 2,363,388 | Boughton et al. | Nov. 21, 1944 |